July 11, 1944.  C. J. McCORMICK  2,353,481
FUEL PRODUCING MACHINE
Filed Aug. 13, 1942  2 Sheets-Sheet 1

Clarence J. McCormick
INVENTOR.

July 11, 1944.   C. J. McCORMICK   2,353,481
FUEL PRODUCING MACHINE
Filed Aug. 13, 1942   2 Sheets-Sheet 2
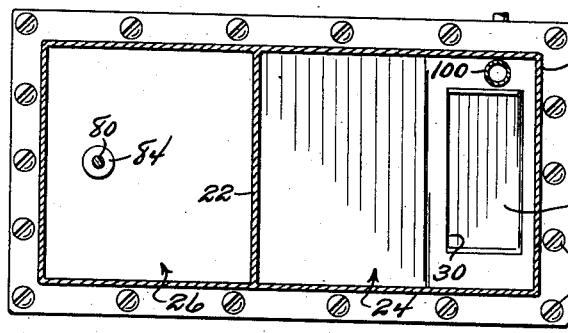
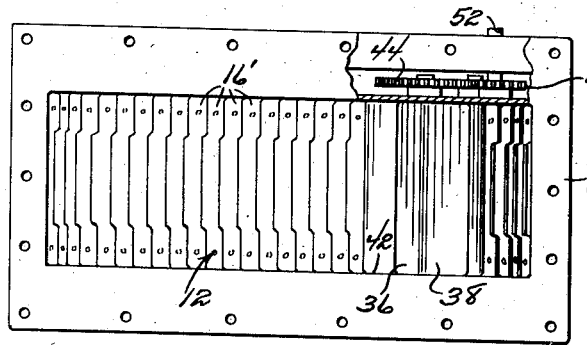
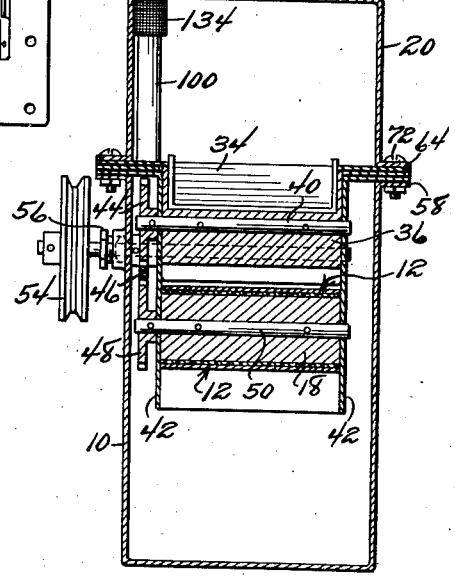
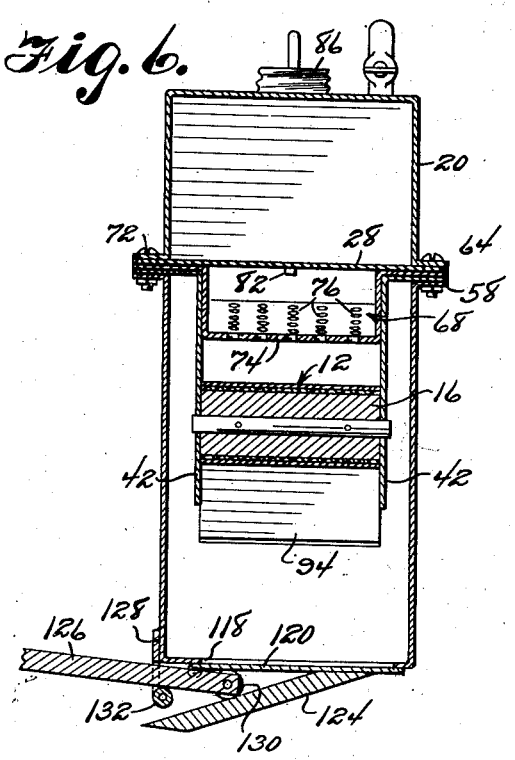
Clarence J. McCormick
INVENTOR.

Patented July 11, 1944

2,353,481

UNITED STATES PATENT OFFICE 2,353,481

FUEL PRODUCING MACHINE

Clarence J. McCormick, Oakland, Calif.

Application August 13, 1942, Serial No. 454,709

2 Claims. (Cl. 48—4)

My invention relates to engine fuels, and has among its objects and advantages the provision of novel means for manufacturing such fuels from carbides.

In the accompanying drawings:

Figure 3 is a sectional view along the line 3—3 of Figure 2.

Figure 4 is a plan view of a conveyor, and a carbide feeding means.

Figure 5 is a sectional view along the line 5—5 of Figure 2, and

Figure 6 is a sectional view along the line 6—6 of Figure 2.

Figure 1:
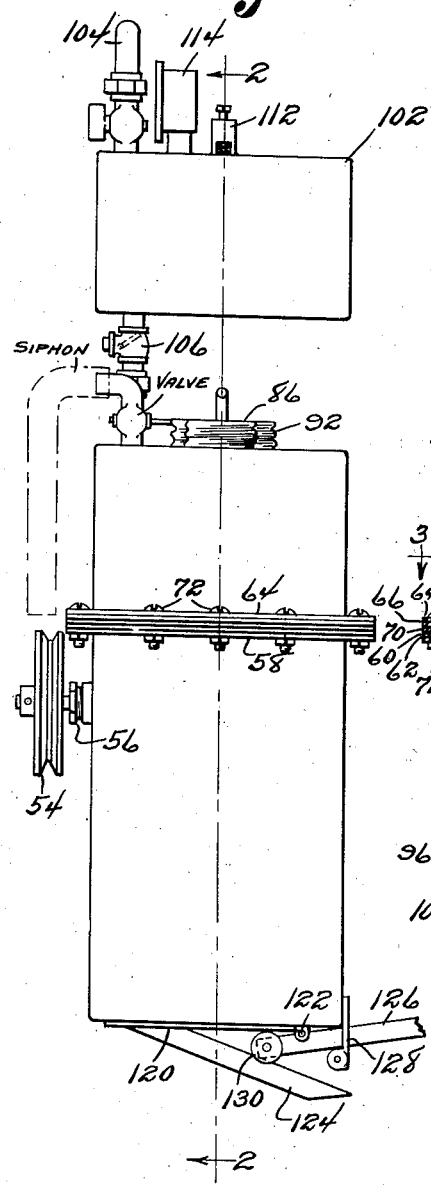
Figure 1 is an end view of the invention.
Figure 2:
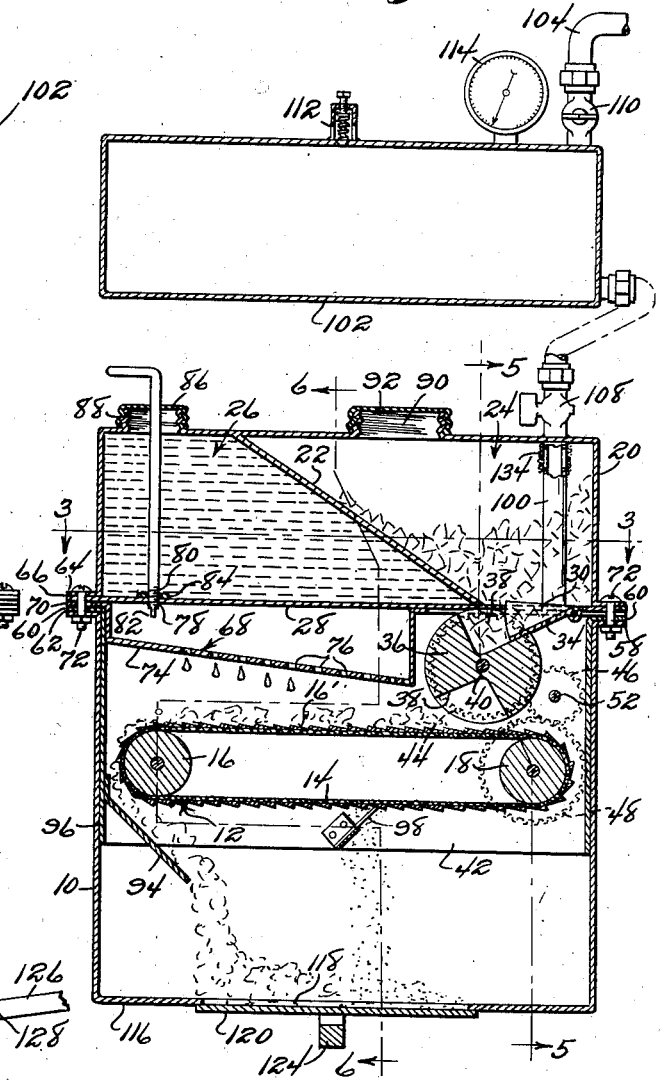
Figure 2 is a sectional view along the line 2—2 of Figure 1.

In the embodiment of the invention selected for illustration, I make use of a tank 10 having a horizontal conveyor 12 mounted therein. This conveyor comprises an endless belt 14 operating on rollers 16 and 18. The load carrying surface of the belt 14 is provided with transverse metal plates or cleats 16'.

Upon the tank 10 is mounted a second tank 20 having a partition 22 arranged therein at an angle to the horizontal to provide a carbide containing chamber 24 and a water containing chamber 26. A partition 28 is interposed between the tanks 10 and 12 and is provided with a carbide feeding opening 30 which is periodically opened and closed by a hinged door 34. This door opens downwardly and is actuated by a feed roller 36 having longitudinal grooves 38 therein for periodically feeding measured quantities of carbide onto the conveyor 12. The roller 36 is positioned closely to the partition 28 so that the roller moves the door 34 to a closed position through engagement between the roller and the door, but the door drops to an open position as the grooves 38 are successively brought underneath the door.

The roller 36 is attached to a shaft 40 journaled in vertical supporting plates or walls 42. These walls lie closely to the side edges of the conveyor 12 and function as a trough to hold the carbide on the conveyor as it travels from a position closely adjacent the roller 18 to the discharge end of the conveyor at the roller 16. A gear 44 is attached to the shaft 40 and meshes with an idler gear 46 meshing with a gear 48 fixed to a shaft 50 to which the roller 18 is attached. The idle gear 46 is attached to a shaft 52 provided with a drive pulley 54 for connection with a belt not shown. A stuffing box 56 is provided on one wall of the tank 10 through which the shaft 52 extends to provide a gas-tight bearing for the shaft.

The tank 10 is provided with a flange 58 which supports the flange 60 on the walls 42. A seal 62 is interposed between the flanges 58 and 60. The partition 28 lies underneath a flange 64 on the tank 20. A seal 66 is interposed between the partition and the flange 64. A drip pan 68 is located underneath the partition 28 and includes a flange 70 interposed between the partition 28 and the flange 60. A seal is also provided between the flange 70, the partition 28 and the flange 60. All the flanges are bolted into a unitary structure by bolts 72.

The drip pan 68 includes a bottom 74 declining from one end of the tank 10 in the direction of the roller 18. This bottom is provided with perforations 76 through which water may drip onto the carbide on the conveyor 12.

A threaded opening 78 is provided in the partition 28 for a threaded valve rod 80 having a portion cut away at 82 to flow water from the chamber 26 into the drip pan 68. A valve 84 in the nature of a flange is fixed to the valve rod 80 for engagement with the partition 28 to cut off the flow of water to the drip pan. The valve rod 80 extends through an opening in a cap 86 threadedly connected with a filler neck 88. A filler neck 90 is provided for the chamber 24 and a cap 92 is threadedly connected with the neck 90.

A deflecting flange 94 is attached to one of the end walls 96 connecting the walls 42 for deflecting the material dropped from the discharge end of the conveyor 12 to a more central point inside the tank 10. A scraper 98 is mounted on the walls 42 to engage the lower run of the conveyor 12.

A gas conveying pipe 100 extends vertically through the chamber 24 and has communication with the tank 10. This pipe extends upwardly through the top of the tank 20 and leads to a storage tank 102 having a feed line 104 communicating therewith and adapted for connection with an engine not shown.

A check valve 106 is incorporated in the pipe 100 above a manually controlled valve 108. A manually controlled valve 110 is also interposed in the feed line 104. The tank 102 is provided with a safety valve 112 and a pressure gauge 114.

The bottom 116 of the tank 10 is provided with an opening 118 normally closed by a door 120. This door may be opened to dump any accumulations in the tank. In Figures 1 and 6, the door 120 is hinged at 122 to the bottom 116 and is provided with an angular member 124. A rod 126 is slidably guided in a guide 128 attached to the tank 10. This rod is provided with a roller 130 engageable with the member 124 adapted to wedge between the cover and the member, with the rod 126 engaging a roller 132 to hold the door in a closed position. Withdrawal of the rod permits the door to swing down for dumping purposes.

In operation, the conveyor 12 moves at a relatively low speed, and the valve rod 80 is adjusted to flow the proper amount of water onto the carbide on the conveyor. The gases are passed to the tank 10 from which they may be taken as a source of engine fuel. Gases accumulating in the chamber 24 pass through a screened opening 134 in the pipe 100.

Without further elaboration, the foregoing will so fully explain my invention, that others may, by applying current knowledge, readily adapt the same for use under various conditions of service.

I claim:

1. In a gas generating apparatus, a generating chamber, a tank mounted on the chamber having a carbide compartment and a water compartment, the said compartments communicating with the top of the chamber through feed passages, an endless conveyor mounted in the chamber below the tank and disposed to carry carbide in a horizontal plane in the chamber, a grooved roller rotatably mounted in the chamber in registration with the carbide feed passage and adapted to periodically load measured quantities of carbide at one end of the conveyor, and selectively controlled valve means for dropping water from the water compartment on the carbide as it is carried from the loading to the discharge end of the conveyor.

2. In a gas generating apparatus, a generating chamber, a tank mounted on the chamber having a carbide compartment and a water compartment, the said compartments communicating with the top of the chamber through feed passages, an endless conveyor mounted in the chamber below the tank and disposed to carry carbide in a horizontal plane in the chamber, a grooved roller rotatably mounted in the chamber in registration with the carbide feed passage and adapted to periodically load measured quantities of carbide at one end of the conveyor, a perforated plate supported in inclined position above the conveyor, and exteriorly controlled valve means for regulating the discharge of water from the water compartment onto the perforated plate for dropping water on the carbide as it is carried from the loading to the discharge end of the conveyor within the generating chamber.

CLARENCE J. McCORMICK.